(12) United States Patent
Baratz

(10) Patent No.: US 8,972,294 B2
(45) Date of Patent: Mar. 3, 2015

(54) SYSTEM AND METHOD FOR PAYMENT STRUCTURES IN THE PURCHASE AND DISTRIBUTION OF CONSUMABLES, INCLUDING HEATING OIL OR PROPANE

(75) Inventor: Philip J. Baratz, Fort Lauderdale, FL (US)

(73) Assignee: Philip J. Baratz, Fort Lauderdale, FL (US)

( * ) Notice: Subject to any disclaimer, the term of this patent is extended or adjusted under 35 U.S.C. 154(b) by 239 days.

(21) Appl. No.: 13/560,610

(22) Filed: Jul. 27, 2012

(65) Prior Publication Data

US 2013/0041795 A1 Feb. 14, 2013

Related U.S. Application Data

(60) Provisional application No. 61/521,821, filed on Aug. 10, 2011.

(51) Int. Cl.
| | | |
|---|---|---|
| G07B 17/00 | (2006.01) | |
| G06F 19/00 | (2011.01) | |
| G06Q 10/00 | (2012.01) | |

(52) U.S. Cl.
CPC ..................................... *G06Q 10/00* (2013.01)
USPC ............................................. 705/34; 705/28

(58) Field of Classification Search
None
See application file for complete search history.

(56) References Cited

U.S. PATENT DOCUMENTS

| | | | |
|---|---|---|---|
| 6,341,271 B1 | 1/2002 | Salvo et al. | |
| 2005/0209934 A1 | 9/2005 | Irby et al. | |
| 2005/0289021 A1* | 12/2005 | Lagergren | 705/28 |
| 2006/0102759 A1 | 5/2006 | DeLong | |
| 2008/0243648 A1* | 10/2008 | Uzzo et al. | 705/28 |
| 2009/0009359 A1 | 1/2009 | Belverato | |
| 2009/0070254 A1* | 3/2009 | Thrush | 705/39 |
| 2009/0160674 A1 | 6/2009 | Vangala | |
| 2010/0023162 A1 | 1/2010 | Gresak et al. | |

OTHER PUBLICATIONS

International Preliminary Report on Patentability (IPRP), issued for PCT Application No. PCT/US2012/048647, mailed Feb. 20, 2014, 6 pages.
International Search Report and Written Opinion issued for PCT Application No. PCT/US12/48647, completed Oct. 2, 2012 and mailed Oct. 16, 2012, 7 pages.

* cited by examiner

*Primary Examiner* — Paul Danneman
(74) *Attorney, Agent, or Firm* — Sprinkle IP Law Group

(57) ABSTRACT

A new ecosystem may comprise a central system operable to monitor the consumption of a commodity at the premises of a consumer, interface with suppliers and retailers of the commodity and perhaps tank monitors, process data collected therefrom, and implement a payment structure that can alleviate the burden of consumers having to pay for an entire delivery of the commodity—the consumer is only responsible for paying for the amount actually consumed during a time period at a prevailing price during that time. The payment structure can also significantly reduce a retailer's working capital required to float the purchase of the commodity before it is paid by its consumers. The central system may provide a web based user interface through which a consumer can lock in a price to pay for the commodity. Alternatively, the price may be fixed when the commodity was delivered to the consumer's tank.

20 Claims, 8 Drawing Sheets

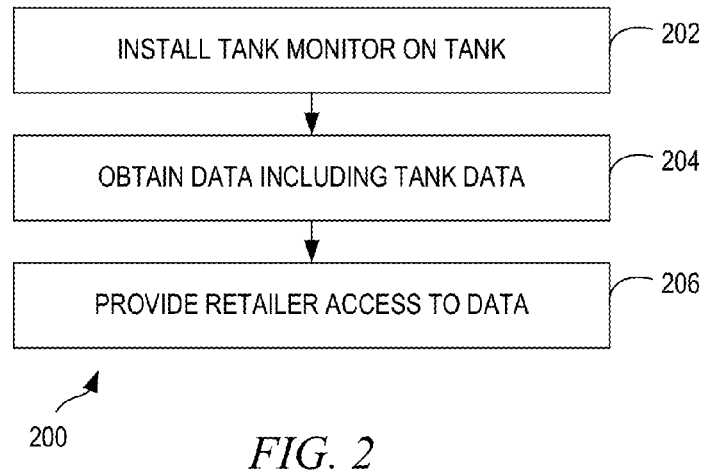
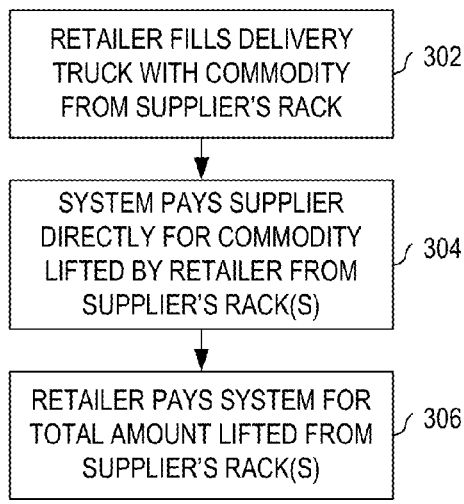
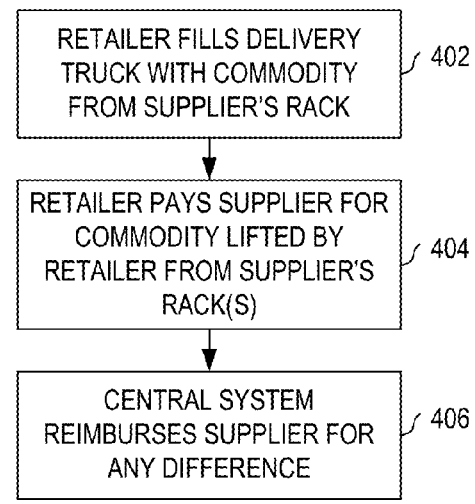

INVOICE/STATEMENT

Bob Jones
123 Main Street
Suffield, CT 06078
Account #: 299990
FuelTracker #: 0000761C

| *Invoice #* | *Account #* | *Due Date* | *Balance* |
|---|---|---|---|
| 991234567 | 299990 | 02/23/2011 | $665.20 |

Amount Enclosed $ _____

*To ensure proper credit please return the above portion with your payment.*

Invoice Date: 2/4/2011

| Summary | | Statement | |
|---|---|---|---|
| Opening Gallons | 200.8 | Previous Balance | $0.00 |
| + Delivered Gallons | 182.6 | + Current Charges | $665.20 |
| − Consumed Gallons | 250.0 | (see Page 2 for details) | |
| (see Page 2 for details) | | − Payment Received | $0.00 |
| Closing Balance | 133.4 | Total Due | $665.20 |

Deliveries

| Date | Gallons |
|---|---|
| 1/14/2011 | 182.6 |

Consumption

| Dates | Gallons |
|---|---|
| 1/1/2011-1/31/2011 | 250.0 |

Page 1 of 2

INVOICE/DETAIL

Account Name: Bob Jones          Account #: 299990          Invoice Date: 2/4/2011

| Date | Usage | Price/Gallon | Cost |
|---|---|---|---|
| 1/1/2011 | 3 | $2.5990 | $7.80 |
| 1/2/2011 | 8 | $2.5990 | $20.79 |
| 1/3/2011 | 7 | $2.5990 | $18.19 |
| 1/4/2011 | 8 | $2.5990 | $20.79 |
| 1/5/2011 | 10 | $2.5990 | $25.99 |
| 1/6/2011 | 11 | $2.5990 | $28.59 |
| 1/7/2011 | 9 | $2.6990 | $24.29 |
| 1/8/2011 | 14 | $2.6990 | $37.79 |
| 1/9/2011 | 13 | $2.6990 | $35.09 |
| 1/10/2011 | 10 | $2.6990 | $26.99 |
| 1/11/2011 | 6 | $2.6890 | $16.13 |
| 1/12/2011 | 2 | $2.6490 | $5.30 |
| 1/13/2011 | 2 | $2.5990 | $5.20 |
| 1/14/2011 | 8 | $2.5990 | $20.79 |
| 1/15/2011 | 9 | $2.6990 | $24.29 |
| 1/16/2011 | 6 | $2.6990 | $16.19 |
| 1/17/2011 | 3 | $2.6990 | $8.10 |
| 1/18/2011 | 10 | $2.6990 | $26.99 |
| 1/19/2011 | 9 | $2.6890 | $24.20 |
| 1/20/2011 | 8 | $2.6490 | $21.19 |
| 1/21/2011 | 5 | $2.6390 | $13.20 |
| 1/22/2011 | 6 | $2.5990 | $15.59 |
| 1/23/2011 | 7 | $2.5990 | $18.19 |
| 1/24/2011 | 9 | $2.5990 | $23.39 |
| 1/25/2011 | 8 | $2.6990 | $21.59 |
| 1/26/2011 | 10 | $2.6990 | $26.99 |
| 1/27/2011 | 12 | $2.6990 | $32.39 |
| 1/28/2011 | 14 | $2.6990 | $37.79 |
| 1/29/2011 | 12 | $2.6890 | $32.27 |
| 1/30/2011 | 8 | $2.6490 | $21.19 |
| 1/31/2011 | 3 | $2.6390 | $7.92 |
| Totals | 250 | | $665.20 |

Page 2 of 2

*FIG. 8B*

SYSTEM AND METHOD FOR PAYMENT STRUCTURES IN THE PURCHASE AND DISTRIBUTION OF CONSUMABLES, INCLUDING HEATING OIL OR PROPANE

CROSS-REFERENCE TO RELATED APPLICATION(S)

This is a conversion of and claims a benefit of priority from U.S. Provisional Application No. 61/521,821, filed Aug. 10, 2011, entitled "SYSTEM AND METHOD FOR PAYMENT STRUCTURES IN THE PURCHASE AND DISTRIBUTION OF CONSUMABLES, INCLUDING HEATING OIL OR PROPANE," which is fully incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to systems and methods for use in the purchasing and distribution of consumables, including fuels such as heating oil or propane. More particularly, this disclosure relates to systems and methods for supply chain management and payment structures for use in the purchasing and distribution of these consumables, including payment structures that allow payment based on consumption.

BACKGROUND OF THE RELATED ART

Almost all consumables that consumers purchase can fluctuate in price on a regular basis. The periodicity of these fluctuations depends heavily on a variety of factors, including supply and demand, or variables associated with the supply and demand. Certain consumables are more volatile than others, however. These commodities are usually in relatively heavy demand or are widely consumed such that any disruption in the supply of the consumable may cause a commensurate market spike in the prices of these goods. Products of this type include fuel products such as gasoline or diesel, heating oil, natural gas, crude oil, etc. Disruptions in the supply of these consumables (or commodities from which these products are produced) such as those caused by worlds events, natural disasters, etc. may cause the price of these consumables to jump markedly in a relatively short amount of time. These price spikes are quite noticeable, as these types of products are extensively consumed and fluctuations in the price of these products may occur relatively rapidly.

Examples of these types of effects are prevalent in the current ecosystem employed in the purchasing and distribution of heating oil and propane for individual and business consumers. In most cases, a consumer who utilizes heating oil (or propane) has a storage tank located on site. For example, a homeowner whose boiler or furnace utilizes heating oil may have an above-ground storage tank (AST) or an underground storage tank (UST) located in the basement, the garage, outside adjacent to the building or another location. Such tanks may have a capacity of around 275 gallons or more.

These consumers may have a contract with a retailer to supply them with heating oil on a periodic basis as determined by the retailer. The heating oil retailer may therefore determine when heating oil should be supplied to a particular consumer. This may be based on a consumer's request for delivery, via phone call or fax. Alternatively, this determination may involve the use of various factors or estimations, including such information as weather events, house size, K factor, consumption history, etc. One particular factor that may be accounted for is the desire that the consumer not exhaust the supply of heating oil in the consumer's tank. Software for making such determinations may include, for example, BlueCow (e.g., the Ignite suite of software products) Cargas, or Info-sys.

Thus, for a particular day a heating oil retailer may have a set of consumers to which delivery of heating oil is to be made. The retailer may have a fleet of tank trucks to make deliveries. The driver of each truck is given a set of consumers and a route for delivery to these consumers. The route may be optimized based on a variety of factors, including the location of the consumers, the layout of streets in the area, etc. Software such as UPS Logistics or Appian Logistics may be used for such scheduling.

Thus supplied with a set of consumers and a route, a driver for a heating oil retailer may first go to a heating oil supplier (e.g., wholesaler, jobber, refiner, etc.), such as Amerada Hess, to fill his truck. The price paid by the retailer to the supplier for the heating oil may be the price set by the supplier. For example, the price for a certain day may be set at 12:00 a.m. of that day and is sometimes referred to as the "rack price". In most cases the supplier may send an invoice to the retailer and the retailer must pay the supplier on approximately a net 10 days basis.

It should also be noted here, that in some cases a heating oil supplier may have their own (on-site or off-site) storage for heating oil. In this case, a heating oil supplier may deliver a quantity of heating oil to the retailer for storage by the retailer. The retailer's fleet of trucks can then be filled from the retailer's store of heating oil. In this case, the supplier may send an invoice to the retailer at the time of the supplier's delivery to the retailer using the price set by the supplier at midnight on the day of the delivery. Again, the retailer must usually pay the supplier on a net 10 day basis.

In any event, once the retailer's truck has been filled, the driver may make deliver to each of the set of consumers on his list according to the route provided. When a driver delivers to a particular consumer the driver may attach a hose from the truck to the consumer's tank and fill the tank with either a predetermined amount or until a signal (e.g., a tank whistle) is received that the tank is full. A typical delivery of heating oil to a consumer may be around 140-190 gallons. The volume of heating oil provided to the consumer may be metered during the delivery process. For example, in many states it is required that the delivery truck have a meter installed, where the meter is calibrated or otherwise regulated by a government agency. Thus, the amount of heating oil put into a consumer's tank during a delivery may be accurately metered.

After the heating oil is delivered to a particular consumer, the consumer may be given a delivery ticket (physically or electronically) or other indication of the amount delivered, the amount to pay based on the amount delivered and the retail price of the heating oil on the day of the delivery and a notice to please pay the retailer according to the contract between the retailer and the consumer. Such contracts usually specify a net 30 day basis for payment, however, on average, consumers end up paying retailers anywhere between 30 and 45 days after a heating oil delivery occurs. A copy of the delivery ticket or the information associated with the delivery ticket (e.g., amount delivered, retail price, total price, delivery date, delivery time, truck number, consumer number, name or address, etc.) may be reported back to the retailer where such information may be stored.

After the deliveries for the day are complete, then, a retailer may owe the supplier for the amount of heating oil loaded onto the retailer's truck by the supplier at the rack price. The retailer may be on a net 10 day payment basis with respect to the retailer's obligation to the supplier. Similarly, each of the consumers to whom the retailer made deliveries may owe the retailer for the amount delivered to that consumer at the retail price on the day of delivery. While the consumer may be on, for example, a net 30 day payment basis according to some contracts between a retailer and a consumer, in most cases a consumer may pay between 30 and 45 days after delivery.

As may be noticed, the time frame in which a retailer may be obligated to pay the supplier (e.g., 10 days) can be shorter than the time frame in which a retailer may receive payment from the consumer for deliveries. This time spread may put the retailers in a difficult position with respect to payments owed versus payments received. A retailer may thus make certain financial arrangements to pay the supplier or to take care of other financial obligations. For example, once heating oil has been delivered to a consumer and the delivery ticket associated with that delivery entered into an accounting system of the retailer, they may be posted as receivables by the retailer. These receivables can be borrowed against by the retailer (e.g., from a bank or other lending or financial institution) where the funds from such a loan may be utilized to pay the supplier or for other financial obligations of the retailer.

There are a number of problems with the current heating oil ecosystem. As the cost of making deliveries by a retailer is currently high, and will seemingly increase in the future because of costs such as fuel delivery truck equipment, delivery labor, delivery motor fuels, insurance and related administrative expenses; frequent deliveries of heating oil to a consumer are uneconomical.

Accordingly, retailers may only deliver to consumers according to a schedule that will prevent the consumer from exhausting his supply of heating oil. This scheduling means that a typical consumer may receive around 6 deliveries a year, with each delivery being on the order of about 130-190 gallons. In most cases, the consumer is required to pay for the entire quantity delivered shortly thereafter, regardless of the fact that the consumer's inventory of heating oil may be consumed over a long period of time. For example, a consumer may be required to pay for the entire quantity of a heating oil delivery that occurred at the end of the spring, even though the vast majority of the heating oil delivered may not be consumed until the next fall or winter. As heating oil costs have increased dramatically (e.g., up to 100%-200%) in recent years, the up-front costs of these heating oil deliveries has soared, challenging both commercial and residential household budgets.

Furthermore, dramatically increasing day-to-day fuel price volatility has made the timing of delivery (resupply) decisions by the retailer critical. This situation exists both because these decisions are out of the control of the consumer and additionally because the consumer is charged the retail price prevailing on the day of the delivery resupply event. As the timing decisions of deliveries is solely within the purview of the retailer, the consumer may be completely exposed to any prevailing market price and large uncertain payment requirements without advance knowledge of the timing or cost of the incoming delivery.

Retailers have therefore offered certain fuel payment options to a consumer. In most cases the payment options involve the retailer entering into a (i) fixed price requirements contract, (ii) with the additional related option of allowing the consumer to make equal installment payments over an extended period, (iii) and with the further optional feature of converting the fixed price into a "cap" arrangement for a fee. This "blunt force" payment spreading method suffers from numerous disadvantages such as that the "fixed price" is usually set before the use season and it may be higher or lower than actual prevailing retail price during the actual period when the heating oil is utilized. If retail prices drop during the period during which the heating oil is consumer the end consumer is required to continue to pay the higher contracted fixed price unless, in certain instances, they have purchased very expensive "cap" insurance that allows their fixed fuel price to drop when fuel market prices drop. However, even these expensive "cap" insurance arrangements may expose the consumer to the volatile retail price of fuel on the day when the fuel is delivered by the supplier. Daily spot prices may differ by 20-30% or more within single delivery days of a single month.

Furthermore, these types of payment programs generally have equal monthly payments based upon estimated future use volumes. The volume estimates may be incorrect based upon unexpected weather volatility or other issues, which expose end consumers to over or underpayments and residual additional unexpected cash payments or very large cash prepayments. Moreover, these programs continue to rely on large working capital-intensive and expensive fuel inventory safety stocks as fuel deliveries continue to be based solely upon supplier estimates or rules of thumb.

In addition to imposing a burden on consumers, the current heating delivery ecosystem may additionally create friction between a consumer and a retailer, as a consumer may pay a high price for a delivery occurring one day while his neighbor may pay a significantly lower price for heating oil delivered only a short time earlier or later. Consumers may then wonder why they were charged more for their delivery. In the same vein, consumers may easily engage in Internet price discovery to determine price differentials or price programs offered by other retailers.

This dissatisfaction with retailers along with the consumer's ownership of both the tank hardware and the heating oil within the tank has resulted in a large degree of switching of consumers between retailers. More specifically, because a consumer may own their tank, and any fuel within the tank (because they paid for the entire amount delivered), there are few barriers or costs associated with switching retailers. Thus, consumers may switch retailers fairly often based on a number of factors, such as discounts offered by retailers or for a variety of other reasons. In fact, some of the biggest retailers of heating oil may experience a gross loss rate of 10% or more of their entire consumer base each year.

Retailers also have various other problems in this ecosystem. As discussed, a retailer may purchase heating oil on a net 10 day basis from the supplier and the consumer is billed upon delivery. The consumer may be on a net 30 day payment basis with the retailer, but typically pays on average between 30 and 45 days. Therefore, the heating oil retailer is currently exposed to 20-35 days of working capital requirements.

Given the deficiencies of the current ecosystem in the purchasing and distribution of consumables, including heating oil and propane, there is always room for innovations and improvements.

SUMMARY

Embodiments of systems and methods disclosed here may substantially ameliorate the aforementioned deficiencies of the current ecosystem in the purchasing and distribution of consumables, including heating oil and propane. Within this disclosure, a consumable may, for example, be a commodity whether traded on an exchange or not. Examples of a commodity may include, but are not limited to, heating oil, propane, lube products such as motor oils, fuel products, agricultural products, etc. Within this disclosure, consumers of a commodity may refer to both home owners (residential consumers) and commercial entities (business consumers).

Embodiments may utilize fuel tank monitoring devices to monitor the volume of a commodity in a consumer's tank. For the sake of example and not of limitation, heating oil will be used as an example commodity throughout this disclosure. Those skilled in the art will appreciate that other embodiments may be adapted for various types of commodities.

As this monitoring may be precise and substantially continuous, the volume of heating oil utilized by a consumer in a given time period (for example, a day, an hour, week, a month, etc.) may be ascertained. In one embodiment, the consumer may be billed for their consumption of heating oil during that time period at a prevailing price during the same time period. Notice then, that each consumer is only responsible for paying for the amount of heating oil actually consumed as opposed to an entire bulk delivery during a tank fill event. Additionally, notice that the prices paid by the consumer are based directly on the prevailing price at the time of the consumer's actual consumption. Thus, the consumer is alleviated of the burden of paying for an entire delivery of heating oil at the time of delivery as the consumer only has to pay for the amount of heating oil actually consumed during the time period. Furthermore, the risk of price fluctuations associated with these deliveries that is borne by the consumer is substantially alleviated, as the consumer only has to pay the prevailing price during the time period in which the heating oil was actually consumed.

In one embodiment, a consumer may be billed for their consumption of heating oil during a given time period at the price of the day of delivery from the truck. In this embodiment, because the truck is (in some cases, required to be) equipped with a certified measuring device, the tank monitoring device does not need to be certified. In this embodiment, the tank monitoring device can be used only for measuring daily usage and the amount to be billed during a billing cycle. The price charged to the consumer is not altered on a day-by-day basis, but rather the price is fixed when the commodity was delivered to the consumer's tank.

In one embodiment, a consumer can use a consumer facing web site provided by the system disclosed herein to "lock" or "cap" the price they pay for the commodity. The consumer may do so at different times over the life cycle of usage of the commodity.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 2 depicts a flow diagram illustrating one embodiment of an example process that can be utilized to set up an account for a consumer of a commodity to be physically delivered by a supplier of the commodity to a storage tank at the consumer's site, the account being linked to or otherwise associated with a retailer of the commodity;

FIG. 3 depicts a flow diagram illustrating one example embodiment of a payment structure for the new ecosystem disclosed herein;

FIG. 4 depicts a flow diagram illustrating another example embodiment of a payment structure for the new ecosystem disclosed herein;

FIGS. 8A and 8B depict pages 1 and 2 of an example invoice for a consumer of a commodity;

DETAILED DESCRIPTION

Figure 1:
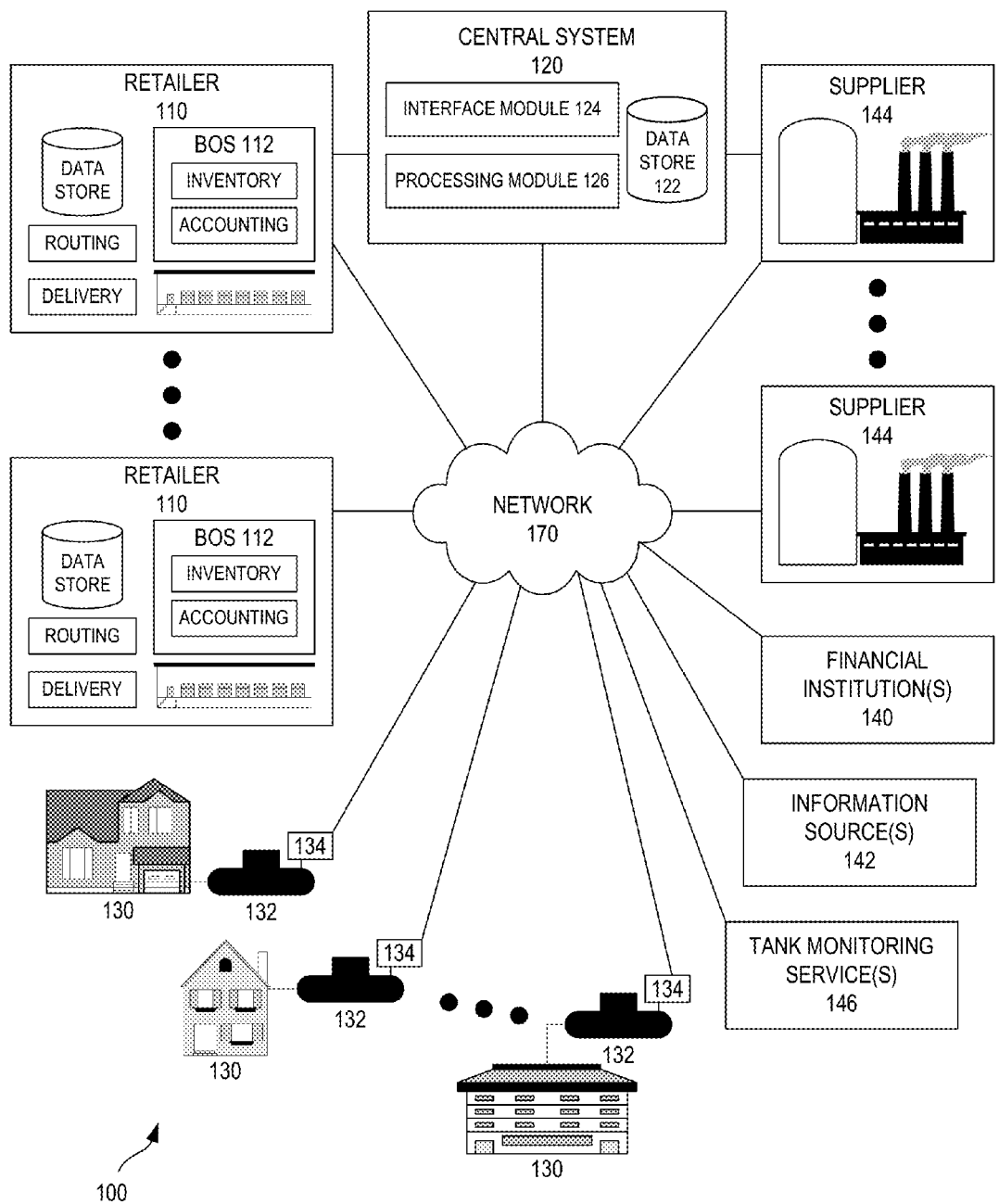
FIG. 1 depicts a diagrammatic representation of a simplified topology of a new ecosystem in which embodiments disclosed herein may be implemented.

Reference is now made in detail to the exemplary embodiments of the invention, examples of which are illustrated in the accompanying drawings. Wherever possible, the same reference numbers will be used throughout the drawings to refer to the same or like parts (elements). The systems and methods of the invention may be particularly useful in the context of the purchase and distribution or heating oil or propane purchase and distribution and thus it is in this context that embodiments of the invention may be described. It will be appreciated, however, that embodiments of the systems and methods disclosed herein may be applicable to the purchase and distribution of almost any desired consumable whether traded on an established trading market or not.

As discussed above, many deficiencies exist in the current ecosystem in the purchasing and distribution of consumables, including heating oil and propane. Thus, there is a need for systems and methods for these systems that may substantially ameliorate these deficiencies.

To that end, attention is now directed to the systems and methods presented herein, embodiments of which may be employed to implement a payment and distribution ecosystem for use in the purchasing and delivery of consumable commodities such as heating oil, propane, motor fuels, such as diesel, or the like. More specifically, embodiments of these systems and methods may utilize fuel tank monitoring devices to monitor the volume of heating oil in each consumer's tank. As this monitoring may be precise and substantially continuous the volume of heating oil utilized by a consumer in a given time period (for example, a day, an hour, week, a month, etc.) may be ascertained. The consumer may then be billed for their consumption of heating oil during that time period at a prevailing price during that time period. For example, a consumer may be given a monthly bill or invoice detailing each day's usage volume, the prevailing price on that day, the charge for each day based on the volume used that day and the associated retail price for that day and an overall charge for the month. Alternatively, the consumer may be billed for their consumption of heating oil during that time period at a price that is fixed on the day the heating oil was delivered (and measured) by a truck equipped with a certified measuring device. In yet another embodiment, the consumer may be billed for their consumption of heating oil during that time period at a price that the consumer has "locked in" for a period of time.

Thus, the consumer is alleviated of the burden of paying for an entire delivery of heating oil at the time of delivery as the consumer only has to pay for the amount of heating oil actually consumed during the time period. Furthermore, the risk of price fluctuations associated with these deliveries that is borne by the consumer is substantially alleviated, as the consumer only has to pay the prevailing retail price during the time period in which the heating oil was consumed.

In some embodiments, the implementation of such a payment structure may be facilitated using a system (also referred to herein as the central or PAYGo system) that is communicatively (e.g., wired or wireless network, non-electronically such as by mail or fax, etc. or some combination) coupled to the tank monitors used on the tanks of consumers and to systems used by retailers of heating oil. The use of such a central system may allow the implementation of an ecosystem (referred to herein as the new or PAYGo ecosystem) in which consumers or retailers may contract with the operators of the PAYGo system. The operators of the PAYGo system may then help supplement the implementation of this payment structure through the collection or provisioning of data or funds to or from the tank monitors, retailers or suppliers.

The central system's position in this type of ecosystem can be leveraged for a number of advantages. As mentioned above, the consumer may be benefitted as they are only required to pay as they consume and at a price based on a price point prevailing during the time period during which they consume, alleviating the burden of paying for an entire delivery at once. Furthermore, as sophisticated tank monitoring equipment may be installed on the consumer's tank and detailed consumption data may be presented to the consumer in conjunction with the consumer's bill the consumer may be provided with the ability and information to make more informed and dynamic decisions with respect to heating oil consumption. Additionally, the use of such sophisticated monitoring equipment may provide the ancillary ability to monitor consumer's equipment through tank monitoring and consumption information. Thus, failure or defective equipment or other conditions to be investigated may be more easily detected and the consumer notified. A consumer may also be provided the ability to monetize the heating oil in his tank by selling any unused quantity to the operators of the central system, for example, at the time of initial delivery from a retailer in conjunction with that consumer's PAYGo contract. Alternatively, the consumer may not be billed by the operators of PAYGo until the amount of heating oil in the tank that existed before the initial delivery in conjunction with that consumer's PAYGo contract has been consumed.

Certain advantages may also be provided to retailers under the new ecosystem. One advantage is that the PAYGo ecosystem may provide an incentive for the consumer to stay with a retailer. For example, a consumer's contract with the operators of the PAYGo system may specify that if a consumer leaves the PAYGo ecosystem (e.g., switches to a retailer that is not contracted with PAYGo) they would be immediately financially liable for and must immediately pay for all heating oil delivered to their tank for which they have yet to be billed under the PAYGo ecosystem. This contract will create substantial retailer switching costs for the consumer and thus will substantially reduce consumer attrition and turnover for retailers.

Furthermore, the central system may have highly complex data from a variety of sources, including tank monitoring data or certain local weather forecasts and a large number of financial arrangements with suppliers and financial institutions. Thus, operators of the central system may have the ability to provide, or utilize, detailed forensic economic order quantity (EOQ) fuel resupply algorithms which seamlessly integrate with proprietary fuel delivery scheduling optimization software. The new ecosystem therefore facilitates sophisticated K factoring and scheduling of deliveries by retailers. The central system may also provide logistics for delivery or provide other information for retailers to schedule supply or delivery, or information for other logistical or financial operations such that heating oil dealers are relieved of the necessity and burden of making such determinations and arrangements.

The central system may also use such data including a gallons consumed by a consumer and current volume in the tank of a consumer to actually forecast a retail fuel dealers daily delivery requirements and order these truckload requirements from a supplier for a retailer. Moreover, the operators of the central system can also prepay or finance the fuel purchase from the supplier such that the retailer can take delivery of the fuel without any further payment obligation by the retailers to the supplier (for example, previously under ten day terms). The oil retailer can collect funds from the consumer monthly (or at some other interval) based upon actual use.

The retailer's contract with the operators of the central system in these circumstance may specify that the retailer is responsible for payment to the operators of the central system for the quantity of fuel purchased from the supplier at some point on or after the monthly billing cycle is concluded (for example, after monthly bills have been sent from the retailer to the consumer, or after the payment from consumer is due with respect to a monthly billing cycle such as 15 days after the end of the month, 30 days after the end of the month, 45 days after the end of the month, etc.). In this manner, as the payment due from a retailer to operators of the central system may be due after the retailer is supposed to be paid by the consumer, the heating oil retailer is no longer required to float the purchase of heating oil. Thus, a retailer's working capital requirements are significantly reduced and may reduce a retailer need to borrow against receivables to pay for such purchases. Alternatively, in some cases, payments from consumers may be received directly by operators of the central system. In such cases, the retailer may be substantially alleviated of the need to bill or collect these accounts receivable.

As an additional, and adjunct, benefit to retailers, the ability to retain consumers along with other advantages provided by the new ecosystem as detailed herein may therefore also increase the value of the retailer's franchise.

As facilitators of the new ecosystem, certain benefits and advantages may also accrue to the operators of the central system. As the operators of the central system will control highly-distributed and hyper-localized physical resupply and inventory replenishment decisions at a large number of locations and as it will control and have an interest in these physical inventories, the operators of the central system will have created a massive physical inventory hedging opportunity for it to profit by. Additionally, this arrangement allows for the aggregation of fuels inventory and accounts receivable financing such that lower financing costs or lower heating oil costs can be secured.

The efficacy of the new ecosystem detailed herein also creates a natural barrier to the exit of retailers from such an ecosystem as well. Once consumers have the ability to pay as they consume they will grow to enjoy the freedom it offers. Thus, retailers are disincentivized from leaving the PAYGo ecosystem as their departure may result in both the loss of the financing of their purchases from suppliers and additionally their ability to let their consumers pay as they consume which may, in turn, result in the consumers leaving the retailer for a retailer which is part of the PAYGo ecosystem and will allow a consumer to pay as they consume.

Example embodiments implementing the aforementioned central system and new ecosystem and methods for these systems may be better explained with reference to the accompanying drawings. FIG. 1 depicts one embodiment of an ecosystem which may be used to implement embodiments of the systems and methods disclosed herein. Ecosystem 100 (an embodiment of a PAYGo ecosystem) comprises central system 120 (an embodiment of a PAYGo system), retailers 110, consumers 130 and suppliers 144. Suppliers 144 may be refiners, jobbers, wholesalers or any other entity which provides a commodity such as heating oil, propane, motor fuel, diesel fuel, etc. Example suppliers 144 may include Amerada Hess, Amoco, BP Oil Products, etc.

Retailers 110 may be entities that contract with consumers 130 to provide heating oil to consumers 130 in a geographic region. These retailers 110 may own a fleet of delivery vehicles which they fill (also known as lifting) by purchasing heating oil from one or more suppliers 144. The retailer 110 can then deliver the heating oil to a consumer. Example retailers 110 may include Krupa Oil Company of Suffield, Conn., etc.

Each retailer 110 may have a back office system 112 and a data store. Such a back office system (BOS) 112 may include functionality such as an accounting/billing module, billing module, inventory module, etc. Additionally, these retailers 110 may have a routing module or delivery scheduling module. Providers of BOS systems 112 in the retail heating oil space include ADD Systems, Great Plains, Cargas, InfoSys, Vertrax (propane), Taurus, AWE, Marketline, Blue Cow Software, etc.

Central system 120 is communicatively connected (through network 170 or other network connection(s)) to computing devices (e.g. computer systems, personal data assistants, kiosks, dedicated terminals, or any other electronic device having processing capabilities) at retailers 110, heating oil supplier(s) 144, tank monitoring service(s) 146, financial institution(s) 140 and external information source(s) 142. Central system 120 may have one or more interfaces 124 to supplier(s) 144, retailers 110, tank monitoring service(s) 146, financial institution(s) 140 or external information source(s) 142 to collect or provide data to or from these entities and a data store 122 to store data obtained, used or created. As an example, interface 124 may operate to parse a string received at central system 120 to extract various pieces of information and store the extracted pieces of information in one or more tables residing in data store 122.

Central system 120 may also have one or more processing modules 126 to perform any processing or functionality associated with embodiments disclosed herein. Network 170 may be for example, the Internet a Local Area Network (LAN), a wide area network (WAN), or any other type of electronic or non-electronic communication link such as mail, courier services or the like. External information source(s) 142 may provide weather information, market information, etc. to central system 120.

Each of consumers 130 may have a tank 132 (e.g., an AST or UST) used to store heating oil for use by consumer 130. FIG. 2 depicts a flow diagram illustrating one embodiment of example process 200 that can be utilized to set up an account for consumer 130. When consumer 130 chooses to join ecosystem 100, for example, by signing a contract with a retailer 110 who has contracted with operators of central system 120 to become an ecosystem 100 affiliated retailer, tank monitoring device 134 (also referred to as a fuel tracker) may be installed on tank 132 of that consumer (step 202).

Tank monitor 134 may operate to obtain various pieces of data associated with tank 132 (step 204), including a measurement of the amount of product in tank 132, the temperature of the tank, external temperature, and so on. Other data may also be monitored using tank monitor 134. Such measurements may be taken on almost any time frame desired. Various tank monitors or services are available from, for example, Enertrac, Wesroc and Visitank. Those skilled in the art can appreciate that tank monitors may implement a variety of transmission technologies, including (i) radio frequency (RF) transmission, (ii) phone line data transmission, (iii) cell phone transmission or (iv) satellite transmission.

Tank monitoring service 146 may collect data from each of these tank monitors 134 and report such data to central system 120. Alternatively, central system 120 may interface with each of these tank monitors 134 to collect data associated with tank 132. In any event, at step 204, central system 120 may obtain data on tanks 132 of consumers 130 including, for example, consumption data or other data such as current volume or depth of heating oil in the tank, amount of free space in a tank, the temperature of the tank or heating oil within the tank, etc. In this way, central system 120 may have consumption data specific to each consumer 130, as determined by central system 120 utilizing data as provided from one or more tank monitoring services 146 or as received directly from tank monitors 134.

At step 206, central system 120 may interface with the BOS 112 at each retailer 110 and provide retailer 110 with access to actual end user delivery information and data that may be used by retailer 110 (also referred to as a dealer) to bill its consumers, operate more efficiently (for example, delivery or scheduling information), or provide the added consumer service functions stemming from the use of the available data such as proactive notification of homeowners in the case of potential tank leaks or frozen pipes. In one embodiment, central system 120 may determine appropriate data stored in its data store and send it to an appropriate retailer's BOS 112. Such data may include data pertaining to a delivery event or a consumption event that occurred during a time period, including for example a specific end user identifier, consumption (in whole gallons), invoicing detail, current tank levels (for example, to assist with more efficient deliveries) and temperature data. It should be noted that for confidentiality and consumer list protection purposes, end user data is typically tied to an identifying code or account number rather than a proper name. This code or account number can be used by retailer 110 in various operations, including for example, in the generation of a bill or invoice.

Each PAYGo affiliated retailer 110 may be granted access to one or more suppliers 144 inventories under an associated PAYGo account to obtain heating oil intended for delivery to consumers 130 affiliated with ecosystem 100. Central system 120 may interface with each supplier's system to obtain Bill of Lading (BOL) detail, for example, via the PetroEx feature, to obtain data regarding lifting of heating oil by retailer 110 from supplier 130 and to establish accounts payable and accounts receivable. Access to this supplier activity allows central system 120 to obtain data on all supplier transactions (for example, with respect to PAYGo affiliated retailers) in near real time and store such data in the data store of central system 120. When desired, such information may also be obtained through other channels (e.g., phone or fax) or manually entered into the data store. This supplier data, including volume and price information may be utilized for inventory tracking and accounts payable/accounts receivable reconciliation in ecosystem 100, including at the retailer or individual consumer level.

Each affiliated supplier 144 may therefore have a contract or other agreement with the operators of central system 120. Such an agreement may comprise terms associated with establishing the physical heating oil supply availability for affiliates of ecosystem 100 that is to be coordinated by operators of central system 120; setting credit support to be provided to supplier 144 to facilitate the sale and availability of heating oil (e.g., for retailers 110); establishing a pricing formula for payment to supplier 144 by operators of central system 120; setting the terms and timing of any repayments, etc. It will be understood that these terms are exemplary only, and that other or different terms may be utilized without loss of generality.

There may also be a contract or other agreement between each of the affiliated retailers 110 and the operators of central system 120. This agreement may comprise the service agreement between the operators of central system 120 and retailer 110, including establishing the obligation of the operators of central system 120 to coordinate heating oil supply to meet 100% of the needs of the retailer's consumers who are part of ecosystem 100 (e.g., who have contracted with retailer 110 under terms specified by central system 120); detailing those consumers of the retailer who are part of ecosystem 100 (this may be updated at any point during the duration of the contract); establishing the operators of central system 120 obligation to pay supplier 144 for all coordinated supply; establishing the pricing formula(s) for payment by the retailer to the operators of central system 120; setting forth terms related to provisioning and use of remote meter reading technology; establishing the operators of the central system's obligation to coordinate the collection and provision of consumer consumption data for billing purposes; setting the terms of repayment (e.g., of the operators of central system 120 financing of the retailer's purchase of heating oil from supplier 144) and the ultimate obligation of retailer 110 for payment of all in-tank product (whether or not consumed) delivered; setting forth the retailer's obligation to deliver all heating oil to the consumer (with accompanying assumption of any liability, including environmental, failure to perform, etc.) associated with delivery); obligating retailer 110 to undertake direct billing to all consumers 130 using the specific consumer data provided by central system 120 from remote tank metering/reading devices 134, establishing the operators of central system 120 right to obtain security interest on the retailer's assets; permitting operators of central system 120 to obtain additional security in the event of financial deterioration of retailer 110, etc. It will be understood that these terms are exemplary only, and that other or different terms may be utilized without loss of generality.

Thus, when a consumer 130 wishes to join ecosystem 100, the consumer 130 may execute a contract or other agreement with an associated retailer 110 to enroll consumer 130 in ecosystem 100 in association with that retailer 110. Such an agreement may be required to establish a homeowner or business on PAYGo service and set forth terms permitting retailer 110 access to the premises to install and repair remote tank monitoring device(s) 134; obligating the consumer to participate in an automatic delivery in order to joining ecosystem 100; establishing pricing approach based on daily consumption and daily price ("Daily Posted Price"); stating the consumer will remain in program until canceled in writing by either party (no set term); setting forth dispute resolution process in case the consumer disagrees with meter reading; stating that any fixed or capped price pricing programs must be separately contracted with the retailer; establishing that upon cancellation the consumer will be responsible for payment for any unconsumed volume delivered to the consumer; etc. It will be understood that these terms are exemplary only, and that other or different terms may be utilized without loss of generality.

Accordingly, at the time of enrollment (e.g., when a consumer signs a contract with a PAYGo affiliated retailer 110), there may be an existing volume of heating oil in the tank 132 of consumer 130. In some embodiments, the operators of central system 120 may purchase this quantity from consumer 130 or it may be agreed that consumer 130 is not to be charged for any quantity of heating oil consumed until consumer 130 has consumed the quantity currently in tank 132 at the time of enrollment.

For any particular day, then, heating oil retailer 110 in ecosystem 100 may have a set of consumers to which delivery of heating oil is to be made. The retailer may have a fleet of tank trucks to make deliveries. The driver of each truck is given a set of consumers and a route for delivery to these consumers.

Thus, supplied with a set of consumers and a route, a driver for a heating oil retailer may first go to a heating oil supplier 144 to fill his truck (referred to as "lifting"). FIG. 3 depicts a flow diagram illustrating one embodiment of payment method 300 representing a new payment structure for central system 120 to pay supplier 144 and be paid by affiliated retailer 110 for the amount of heating oil lifted by affiliated retailer 110. The amount of heating oil lifted by retailer 110 from supplier 144 at step 302 may be reported to central system 120. The operators of central system 120 may be invoiced for this amount by supplier 144.

At step 304, central system 120 may make direct payment to supplier 144 for all volumes lifted from the supplier's racks by retailer 110 based on the terms between the operators of central system 120 and supplier 144. The price paid by the operators of central system 120 to supplier 144 for the heating oil may be a price negotiated between the operators of central system 120 and supplier 144 and may be included in the terms of the agreement between the operators of central system 120 and supplier 144. Thus, retailer 110 is not responsible for payment to supplier 144 for the amount lifted, but is instead responsible to the operators of central system 120 for this amount (step 306). For purposes of this example, suppose that the truck of retailer 110 lifts 3000 gallons from supplier 144, and supplier 144 bills the operators of central system 120 at $3.00 per gallon for a total of $9000. The operators of central system 120 may pay the supplier the $9000 for this purchase based on the terms of the agreement between the operators of central system 120 and supplier 144. In this example, retailer 110 is responsible to the operators of central system 120 for the 3000 gallons lifted from supplier 144.

FIG. 4 depicts a flow diagram illustrating one embodiment of payment method 400 representing another payment structure for ecosystem 100. In this case, for the amount of heating oil lifted by affiliated retailer 110 from the supplier's rack (step 402), retailer 110 pays supplier 144 (step 404) and report the payment and the amount of heating oil lifted by retailer 110 from supplier 144 to central system 120 in accordance with the terms of the agreement between retailer 110 and the operators of central system 120. Based on the terms of the agreement between the operators of central system 120 and supplier 144, the operators of central system 120 may reimburse supplier 144 (step 406) for any difference between the amount invoiced by supplier 144 and the amount paid by retailer 110 to supplier 144.

In any event, once the retailer's truck has been filled, the driver may make delivery to each of the set of consumers on his list according to the route provided. When a driver delivers to a particular consumer 130, the driver may attach a hose from the truck to the consumer's tank and fill the tank with either a predetermined amount or until a signal (e.g., a tank whistle) is received indicating that the tank is full. The volume of heating oil provided to consumer 130 may be metered during the delivery process. For example, in many states it is required that the delivery truck has a certified metering device installed on the truck, where the meter is calibrated and/or otherwise regulated by a government agency. Thus, the amount of heating oil put into a consumer's tank 132 during a delivery may be accurately metered.

Figure 5:
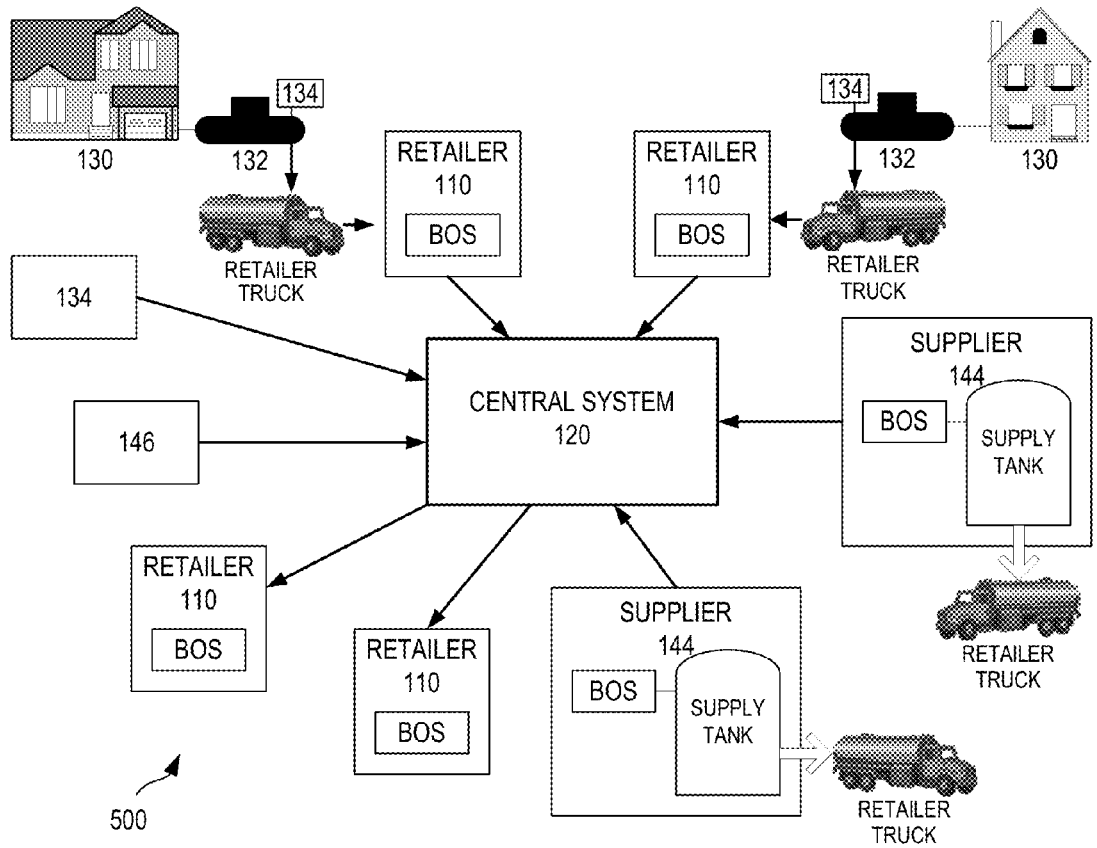
FIG. 5 depicts a diagrammatic representation of an example data flow in the new ecosystem in which embodiments disclosed herein may be implemented.

The data associated with the delivery, including the actual volume delivered as metered may be reported to retailer 110 and stored. As illustrated in data flow 400 shown in FIG. 4 and process flow 500 shown in FIG. 5, in some cases, this data may also be reported to and stored at central system 120. Additionally, data from each of tank monitors 134 on each of consumer 130 in ecosystem 100 may register the increase in the volume of their tanks. This data may also be collected and stored at retailer 110 or central system 120. For example, continuing with the above example, the tank monitoring data may indicate that a total of 1800 gallons was delivered to consumers 130 who are a part of ecosystem 100.

Although examples of ecosystem 100 described above utilize tank monitors 134 to collect data associated with tank 132, other devices capable of measuring, sensing, or otherwise detecting the level of commodity in tank 132 and of transmitting the measured or detected data to central system 120 may also be utilized. Embodiments of ecosystem 100 therefore are not limited to any particular type of tank monitors 134 and may be readily adapted to utilize various data collection devices available now or later.

It will be noted here that retailer 110 may have contracts with consumers to which it makes deliveries that are not part of ecosystem 100. These consumers may be referred to as "will call" customers. In such cases, retailer 110 may owe the operators of central system 120 for any amounts lifted from supplier 144 that are not delivered to consumers 130 who are a part of ecosystem 100 based on the agreement between retailer 110 and the operators of central 120. This payment may be based on terms in the agreement between the operators of central system 120 and retailer 110. These terms may be, for example, at the NYMEX price for that or a subsequent day or a defined amount above the NYMEX price for that day or the subsequent day.

Continuing with the above example, as it can be determined from the lifting information provided by supplier 144 that 3000 gallons were loaded on the retailer's truck and that 1800 gallons were delivered to consumers 130 who were a part of ecosystem 100, retailer 110 may owe the operators of central system 120 for 1200 gallons of heating oil. Suppose here that the price charged to retailer 110 by the operators of central system 120 is $3.20. Thus, the retailer 110 may, at the conclusion of the day, owe the operators of central system 120 $3,840. This transaction may be treated as a wholesale transaction between retailer 110 and the operators of central system 120 and may become an instant receivable for the operators of central system 120.

Figure 7:
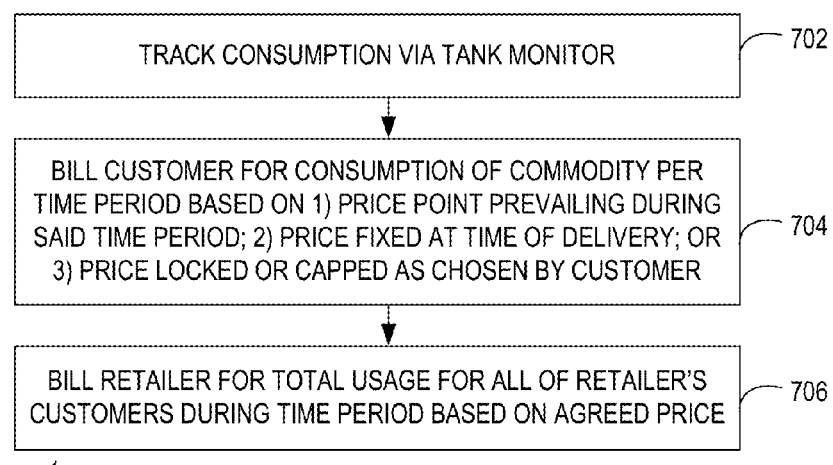
FIG. 7 depicts a flow diagram illustrating one example embodiment of a billing process that may be implemented in various ways in the new ecosystem disclosed herein.
Figure 6:
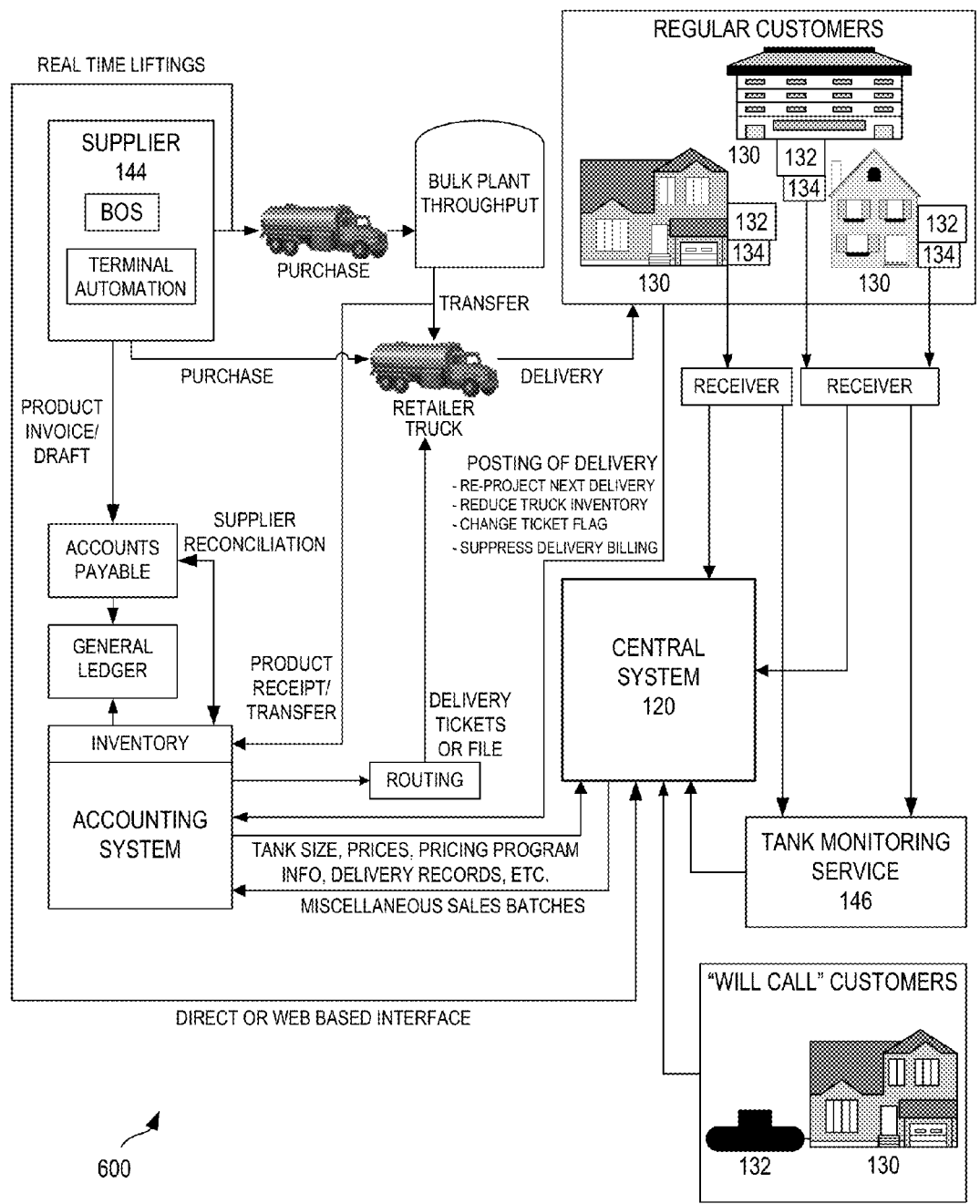
FIG. 6 depicts a diagrammatic representation of an example process flow in the new ecosystem in which embodiments disclosed herein may be implemented.

FIG. 7 depicts a flow diagram illustrating one example embodiment of billing process 700 that may be implemented in various ways in the new ecosystem disclosed herein. After delivery, the consumption of each of those consumers 130 in ecosystem 100 to whom delivery was made by retailer 110 may be tracked using the data from tank monitor 134 associated with each of these tanks 132 (step 702). More specifically, during each of a set of time periods (e.g., hours, days, etc.) a consumer's usage of heating oil may be tracked. This tracking may be accomplished by obtaining data (for example, volume) from tank monitor 134 at the consumer's tank 132 at least at the beginning of the time period and at the end of the time period. The consumer's usage of heating oil during the time period can then be determined (e.g., by subtracting the volume in the consumer's tank 132 at the end of the time period from the volume in the consumer's tank 132 at the beginning of the time period). One or more price points (e.g., NYMEX price, retail price, etc.) prevailing during the time period may also be obtained. Thus, central system 120 may store data that includes the consumer's usage of heating oil during each time period and prevailing price(s) during that time period. For example, central system 120 may store that consumer "A" 130 used 10 gallons of heating oil during a first day when the prevailing retail price was $4.10 and 11 gallons of heating oil on a second day when the prevailing retail price was $4.20. At some regular interval (e.g., daily, weekly, monthly, etc.) central system 120 may report the usage and pricing data associated with a retailer's consumers to retailer 110 or allow retailer 110 access to such data stored at central system 120.

At step 704, then, a retailer may create an invoice for each of its consumers at certain intervals (e.g., monthly, bi-monthly, weekly, etc.) using the data associated with each of its consumers. Such an invoice may detail a consumer's usage during each time period and the price being charged to the consumer for its usage during the time period, where the price charged to the consumer for the usage during that time period may, in one embodiment, be based on a price point prevailing during that time period (e.g., based on the NYMEX price during the time period, the retail price during the time period, the "rack price" during the time period, etc.). In this embodiment, the invoice may thus present a charge for usage over the entire interval (e.g., a month) where the charge for the interval is the aggregate of charges for each of the time periods (e.g., days) and the charge for each time period is based on the usage during that time period and a prevailing price during that time period. For example, the invoice may have each day's usage, the price being charged to the consumer on each day, a total charge for each day, and a total charge for the month. Continuing with the above example, an invoice for consumer "A" may contain the information that consumer "A" used 10 gallons of heating oil during a first day when the prevailing retail price was $4.10 and that the charge for that day is $41.00, 11 gallons of heating oil on a second day when the prevailing retail price was $4.20 and that the charge for that day is $46.20 and similar information for each day of the month along with a charge for the month. An example of consumer invoice 800 is depicted in FIGS. 8A and 8B. The consumer may be responsible for paying the charge for the interval (e.g., monthly charge) to the retailer 110 based on the terms of the agreement between the retailer 110 and the consumer 130, for example, a net 30 day payment basis.

In one embodiment, a retailer may create an invoice for each of its consumers at certain intervals for the consumer's usage during each time period and the price being charged to the consumer for its usage during the time period may be based on a price point occurring on the day of the delivery from the truck. In this embodiment, the invoice may thus present a charge for usage over the entire interval (e.g., a month) where the charge for the interval is the aggregate of charges for each of the time periods (e.g., days) and the charge for each time period is based on the usage during that time period and a price fixed on the day of delivery for each time period. In this embodiment, because the truck is (in some states, required to be) equipped with a certified measuring device, the tank monitoring device does not need to be certified. In this embodiment, the tank monitoring device can be used only for measuring daily usage and the amount to be billed during a billing cycle. Thus, the price charged to the consumer is not altered on a day-by-day basis, but rather the price is fixed when the commodity was delivered to the consumer's tank.

In one embodiment, a retailer may create an invoice for each of its consumers at certain intervals for the consumer's usage during each time period and the price being charged to the consumer for its usage during the time period may be based on a price point that is locked in or capped by the consumer. For example, a consumer can use a consumer facing web site provided by the central system to "lock" or "cap" the price they pay for the consumption of the commodity in their tank. The consumer may do so at different times over the life cycle of usage of the commodity.

Notice then, that each consumer is only responsible for paying for the amount of commodity actually consumed (e.g. during a month) as opposed to an entire bulk delivery during a tank fill event. Additionally, notice that the prices paid by the consumer for the amount of commodity actually consumed can be based directly on a prevailing price at the time of the consumer's actual consumption; on a fixed price at the time of the delivery from the truck, or at a locked or capped price chosen by the consumer. Thus, the consumer is alleviated of the burden of paying for an entire delivery of commodity at the time of delivery as the consumer only has to pay for the amount of commodity actually consumed during the time period. Furthermore, the risk of price fluctuations associated with these deliveries that is borne by the consumer is substantially alleviated, as the consumer only has to pay for the amount of commodity actually consumed during the time period at the prevailing price during the time period or at a price that is either fixed at the time of delivery or capped by the consumer.

Similarly, at some time interval (which may be the same, or a different, time interval at which a retailer 110 invoices its consumers 130), the operators of central system 120 may invoice each of its retailers 110. The invoice for a retailer 110 may comprise a total usage for all of the retailer's consumers 130 who are part of ecosystem 100 during each time period (for example, the aggregate usage of all of the retailer's consumers 130 during each day), the price being charged to the retailer for that time period (which is specified in the terms of the agreement between the operators of central system 120 and retailer 110 and may be, for example, a fixed amount above the NYMEX price for that time period), the charge to retailer 110 for each time period based on the aggregate consumption of their consumers during that time period, and a charge for the entire time interval determined by aggregating the charges for each if the time periods. For example, the invoice to the retailer may have for each day of the month, the total day's usage for all the retailer's consumers 130, the price being charged to the retailer on that day, a total charge for that day, and a total charge for the month. The retailer may be responsible for paying the charge for the interval (e.g., a monthly charge) to the operators of central system 120 based on the terms of the agreement between retailer 110 and the operators of central system 120.

The retailer's contract with the operators of central system 120 in these circumstance may specify that retailer 110 is responsible for payment to the operators of central system 120 for the quantity of commodity used during the interval (e.g., a month) at some point on or after the monthly billing cycle is concluded (for example, after monthly bills have been sent from retailer 110 to consumer 130, or after the payment from consumer 130 is due to retailer 110 with respect to the retailer's monthly billing cycle such as 15 days after the end of the month, 30 days after the end of the month, 45 days after the end of the month, etc.). In this manner, the payment due from retailer 110 to the operators of central system 120 may be due after retailer 110 is supposed to be paid by consumer 130. Accordingly, retailer 110 is no longer required to float the purchase of commodity from supplier 144. Thus, a retailer's working capital requirements can be significantly reduced and may reduce a retailer need to borrow against receivables to pay for such purchases.

Notice that embodiments as presented herein have been described with respect to heating oil, however other embodiments may be applied usefully to almost any consumable. As discussed above, a consumable may, for example, be a commodity whether traded on an exchange or not, examples, including for example, heating oil, propane, lube products such as motor oils, fuel products, agricultural products, etc. A "commodity" may refer to an article of commerce—an item that can be bought and sold freely on a market. It may be a product which trades on a commodity exchange or spot market and which may fall into one of several categories, including energy, food, grains, and metals. Currently, certain commodities that can be traded on a commodity exchange include, but are not limited to, crude oil, light crude oil, natural gas, heating oil, gasoline, diesel, heating oil, propane, ethanol, electricity, uranium, lean hogs, pork bellies, live cattle, feeder cattle, wheat, corn, soybeans, oats, rice, cocoa, coffee, cotton, sugar, gold, silver, platinum, copper, lead, zinc, tin, aluminum, titanium, nickel, steel, rubber, wool, polypropylene, and so on. Note that a commodity can refer to tangible things as well as more ephemeral products. Foreign currencies and financial indexes are examples of the latter. New York Mercantile Exchange (NYMEX) and Chicago Mercantile Exchange (CME) are examples of a commodity exchange. Other commodities exchanges also exist and are known to those skilled in the art.

In a simplified sense, commodities are goods or products with relative homogeneousness that have value and that are produced in large quantities by many different producers; the goods or products from each different producer are considered equivalent. Commoditization occurs as a goods or products market loses differentiation across its supply base. As such, items that used to carry premium margins for market participants have become commodities, of which crude oil is an example. However, a commodity generally has a definable quality or meets a standard so that all parties trading in the market will know what is being traded.

Figure 9:
FIG. 9 depicts an example consumer facing web site providing consumers of a commodity with a means to, among others, manage their accounts and monitor their consumption activity.

As discussed above, central system 120 may host a consumer facing web site through which a consumer can "lock" or "cap" the price they pay for the consumption of the commodity in their tank. FIG. 9 depicts an example login page for consumer facing web site 900. Web site 900 may provide various functions for consumers of a commodity to manage their accounts, monitor their consumption activity, communicate with a service representative, review usage history, learn how to consume more efficiently, etc.

Figure 10:
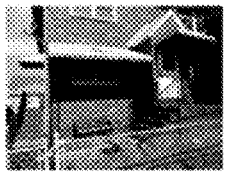
FIG. 10 depicts an example dashboard provided through the consumer facing web site of FIG. 9 and tailored to individual consumers with various pieces of useful information, including their account status, tank type, tank status, tank level, commodity type, consumption activity report, etc.

FIG. 10 depicts example dashboard 1000 provided through consumer facing web site 900. As illustrated in FIG. 10, dashboard 1000 can be tailored to individual consumers with various pieces of useful information, including their account status, tank type, tank status, tank level, commodity type, consumption activity report, etc. Additionally, dashboard 1000 may allow a consumer to view their invoice/statement online, make a payment, reports a problem, etc. Dashboard 1000 may vary from implementation to implementation and maybe integrated with a retailer's web site. Other implementations are also possible and anticipated.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system, comprising:
   at least one processor;
   non-transitory computer readable memory including instructions executable by the at least one processor to implement:
   an interface module for interfacing with a back office system associated with a retailer over a network connection;
   a processing module configured to:
   process data, the data comprising tank data collected at a tank located at a physical location of a consumer, the physical location being external to the system and to the back office system associated with the retailer, the tank storing an amount of a commodity from a supplier, the amount of the commodity being delivered by the retailer, the tank data comprising consumption data specific to the consumer and to the tank;

provide the back office system associated with the retailer with access to the data;

generate an invoice to the back office system associated with the retailer for an amount of the commodity lifted from the supplier by the retailer less deliveries of the commodity made by the retailer during a given time period; and receive an invoice from the supplier for the amount of the commodity lifted from the supplier by the retailer; and a data store storing the data.

2. The system of claim 1, wherein the back office system associated with the retailer comprises at least one of a routing module or a delivery scheduling module.

3. The system of claim 1, wherein the processing module is further configured to provide a back office system of the supplier with access to the data.

4. The system of claim 1, further comprising a tank monitoring device installed on the tank.

5. The system of claim 1, wherein the interface module is further configured to communicate with a tank monitoring device installed on the tank.

6. The system of claim 1, wherein the interface module is further configured to receive delivery information from a device installed on a truck of the retailer.

7. The system of claim 1, wherein the processing module is further configured to generate accounts payable and accounts receivable utilizing the consumption data specific to the consumer and to the tank.

8. The system of claim 1, wherein the interface module is further configured to provide a user interface through which the consumer is able to lock into a price to pay for the amount of the commodity consumed by the consumer over the predetermined interval.

9. The system of claim 1, wherein the consumer is invoiced for the amount of the commodity consumed by the consumer over the predetermined interval at a prevailing price of the commodity during the predetermined interval.

10. The system of claim 1, wherein the consumer is invoiced for the amount of the commodity consumed by the consumer over the predetermined interval at a price of the commodity at a time the amount of the commodity is delivered by the retailer.

11. A method, comprising:

installing a tank monitoring device on a tank located at a physical location of a consumer, the physical location being external to a central system having at least one processor and non-transitory computer readable memory including instructions executable by the at least one processor to implement an interface module and a processing module;

the interface module of the central system interfacing with a back office system associated with a retailer of the commodity;

the processing module of the central system tracking deliveries of a commodity and processing data comprising tank data collected at the tank, wherein the deliveries are made by the retailer of the commodity;

generating an invoice to the back office system associated with the retailer for an amount of the commodity lifted from a supplier by the retailer less deliveries of the commodity made by the retailer during a given time period, wherein the central system performs the generating;

receiving, by the central system, an invoice from the supplier for the amount of the commodity lifted from the supplier by the retailer;

continuously monitoring consumption of the commodity from the tank by the consumer;

calculating an amount the commodity consumed by the consumer over a predetermined interval; and billing the consumer only for the amount of the commodity consumed by the consumer over the predetermined interval.

12. The method of claim 11, wherein an amount of the commodity that has been purchased from the supplier and delivered into the tank by the retailer but not yet consumed by the consumer is a physical inventory item of the central system.

13. The method of claim 11, further comprising calculating net deliveries, the net deliveries representing all deliveries of the commodity made by the retailer during the given time period to members of the central system.

14. The method of claim 11, further comprising communicating with the tank monitoring device installed on the tank, wherein the central system performs the communicating.

15. The method of claim 11, further comprising communicating with a device installed on a delivery truck of the retailer.

16. The method of claim 11, further comprising communicating with a device installed at a distribution terminal of the supplier.

17. The method of claim 11, further comprising the central system generating accounts payable and accounts receivable utilizing information collected from the retailer, the supplier, and the tank monitoring device installed on the tank.

18. The method of claim 11, further comprising providing a user interface through which the consumer is able to lock into a price to pay for the amount of the commodity consumed by the consumer over the predetermined interval.

19. The method of claim 11, further comprising invoicing the consumer for the amount of the commodity consumed by the consumer over the predetermined interval at a prevailing price of the commodity during the predetermined interval.

20. The method of claim 11, further comprising invoicing the consumer for the amount of the commodity consumed by the consumer over the predetermined interval at a price of the commodity at a time the amount of the commodity is delivered by the retailer.

* * * * *